United States Patent
Rao

(10) Patent No.: US 7,261,239 B2
(45) Date of Patent: *Aug. 28, 2007

(54) QUESTIONNAIRE NETWORK FOR MOBILE HANDSETS AND A TRADING SYSTEM FOR CONTRACTS ON USER COMMITMENTS TO ANSWER QUESTIONNAIRES

(76) Inventor: Bindu Rama Rao, 21 Henley Dr., Laguna Niguel, CA (US) 92677

( * ) Notice: Subject to any disclaimer, the term of this patent is extended or adjusted under 35 U.S.C. 154(b) by 242 days.

This patent is subject to a terminal disclaimer.

(21) Appl. No.: 11/010,985

(22) Filed: Dec. 13, 2004

(65) Prior Publication Data

US 2005/0150943 A1    Jul. 14, 2005

Related U.S. Application Data

(60) Provisional application No. 60/530,175, filed on Dec. 17, 2003.

(51) Int. Cl.
*G06K 7/10* (2006.01)

(52) U.S. Cl. ............... 235/472.01; 235/376; 235/378; 705/10; 705/37

(58) Field of Classification Search ........... 235/472.01, 235/376, 378, 381; 705/10, 37
See application file for complete search history.

(56) References Cited

U.S. PATENT DOCUMENTS

| | | | |
|---|---|---|---|
| 6,631,377 B2 * | 10/2003 | Kuzumaki | 707/10 |
| 6,907,402 B1 * | 6/2005 | Khaitan | 705/26 |
| 2002/0138392 A1 * | 9/2002 | LeBlanc | 705/37 |
| 2003/0046140 A1 * | 3/2003 | Callahan et al. | 705/10 |
| 2003/0208433 A1 * | 11/2003 | Haddad et al. | 705/37 |
| 2004/0039684 A1 * | 2/2004 | Sandor | 705/37 |
| 2005/0114400 A1 * | 5/2005 | Rao | 707/104.1 |
| 2005/0144061 A1 * | 6/2005 | Rarity et al. | 705/10 |
| 2005/0283428 A1 * | 12/2005 | Bartels et al. | 705/37 |
| 2006/0036448 A1 * | 2/2006 | Haynie et al. | 705/1 |

* cited by examiner

*Primary Examiner*—Ahshik Kim

(57) ABSTRACT

A questionnaire network makes it possible to create, disseminate, conduct questionnaires or surveys on mobile handsets and to collect results for processing and storage. The questionnaire network is powered by a questionnaire creation tool and a questionnaire trading system. A questionnaire trading system for QTime makes it possible for producers of QTime, such as carriers, and consumers of QTime, such as product manufacturers and advertising companies, to buy or sell QTime in bulk and to trade in QTime as a commodity. In one embodiment, supplementary information and preambles that are part of a questionnaire are captured in audio form using the questionnaire creation tool and are stored selectively along with the questionnaire in a carrier's questionnaire repository or separately at a hosted repository.

25 Claims, 7 Drawing Sheets

QUESTIONNAIRE NETWORK FOR MOBILE HANDSETS AND A TRADING SYSTEM FOR CONTRACTS ON USER COMMITMENTS TO ANSWER QUESTIONNAIRES

RELATED APPLICATIONS

This patent application makes reference to, claims priority to and claims benefit from U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003, docket number BRR2003US04. The complete subject matter of the above-referenced U.S. Provisional Patent Application is hereby incorporated herein by reference, in its entirety.

This patent application makes reference to, claims priority to and claims benefit from U.S. patent application Ser. No. 10/985,702, entitled "QUESTIONNAIRE NETWORK FOR MOBILE HANDSETS," filed on Nov. 10, 2004, docket number BRR2003US03-U1. The complete subject matter of the above-referenced U.S. patent application is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

User interaction in real time, such as those provided for a user using a PC on the Internet, are often not possible for a user using a cell phone. For example, the amount of textual information cannot be a full page of textual information that is typically made available o a PC. Graphical information also cannot be large. A typical website provides a rich multi-media experience. The same website, when accessed from a cell phone, would be not only unreadable but also frustrating. Thus, there is presenting user with information in order to solicit user input when the user is using a cell phone rather than a PC is a big problem.

Cell phones are therefore a device for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to navigate on a cell phone with a small LCD screen and small keyboard for user input.

Quite often, for marketing purposes, a manufacturer or retailer tries to solicit information and feedback from a customer. Typically, flyers and documents are mailed to customers for them to fill in and send it back. The Internet has facilitated some of these interactions. A user may be requested to visit a website and answers a lot of questions. However, contacting a user is a problem. The manufacturer has to determine some user specific information such as addresses, etc. in order to be able to send them questionnaires or request them to provide feedback. Contacting users via postal services or email for making them answer questionnaires or provide feedback, or answer surveys is therefore time consuming, expensive and labor intensive. Users tend to ignore emails sent to them by considering them to be spam. Postal mails are also often ignored for several reasons, including their association with junk mail.

Often, a question asked of an individual elicits responses that may obviate the need to ask further questions. Unfortunately, traditional questionnaires are not setup to take advantage of users responses. Without detailed instructions provided, questionnaires that try to guide users to specific questions based on their potential answers end up being confusing to a user. Therefore, traditional questionnaires are not flexible or dynamically arranged.

Currently, if a manufacturer, marketing organization or advertising company has to purchase a block of "questionnaire time" (QTime) to be used for conducting surveys or questionnaires, there is no mechanisms or institutions to purchase them from. Similarly, if a carrier wants to sell accumulated QTime to manufacturers of consumer products or advertising and marketing companies, there is no forum or sales environment for them to sell them in.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Aspects of the present invention may be seen in a questionnaire trading system that facilitates the trading in QTime, i.e. buying and selling of QTime in bulk based on prices quoted, the prices computed based on current supply of QTime and on forecasts of demand for QTime.

Aspects of the present invention may be seen in a questionnaire network for mobile handsets that facilitates display of questionnaires and collecting responses provided by users. The questionnaire network may comprise a query data population system for creating a questionnaire. The questionnaire comprises a plurality of questions, The questionnaire creation tool comprises a preamble creator for creating at least one of textual, audio or video preambles and user interface screens to create the plurality of questions. Each of the plurality of questions may comprise a question preamble, a question body and an optional supplementary information.

Aspects of the invention are also found in a QTime trading system for facilitating trading in QTime. The QTime trading system comprises a QSupply database for storing and managing a dynamic supply of QTime and a QPricing engine communicatively coupled to the QSupply database. The trading activity manager is communicatively coupled to the QPricing engine and the QSupply database.

Aspects of the invention are also found in a questionnaire creation tool that facilitates creation and storage of questionnaires for mobile device. The questionnaire creation tool comprises an audio capture component that is used to create an audio preamble and a GUI screens to provide a user screens to create a plurality of questions and associated answers for the questionnaire. It also comprises a storage interface that is used to store the questionnaire in a carrier's questionnaire repository to be disseminated to a mobile device.

In one embodiment of the questionnaire creation tool the storage interface is used to store the questionnaire in an external hosted repository.

In another embodiment of the questionnaire creation tool the questionnaire is digitally signed before it is saved.

Aspects of the invention are also found in a questionnaire network comprising a wireless carrier network, a mobile device that operates in the wireless carrier network and a customer attributes associated with the mobile device, that is determined based on the mobile device specifications. The wireless carrier network employs the customer attributes to determine a participant in a survey. The wireless carrier network also targets the participant for the survey and communicates a questionnaire that is retrieved from a questionnaire repository.

In one embodiment, the carrier network tracks the record of the participant in completing the questionnaire. It also determines if the participant makes a good target for subsequent surveys and questionnaires.

In one embodiment, the questionnaire network also comprises a questionnaire creation tool that makes it possible to create questionnaires and surveys. The wireless carrier network disseminates and conducts questionnaires and surveys on the mobile device. The wireless carrier network also collects from the device, a results for processing and storage.

Aspects of the invention are also found in a method of trading in QTime. The method comprises contracting, by a telecom network, with a plurality of subscribers, to participate in a minimum number of questionnaires in exchange for a rebate or a payment, wherein the contracting commits each of the plurality of subscribers to a QTime contract that specifies a QTime quota. It also comprises aggregating the QTime contracts from the plurality of subscribers to create a QTime aggregated contract, supplying the QTime aggregated contract to a QTime trading system for trading purposes and receiving trading requests from at least one QTime consumer to buy or sell the QTime aggregated contract. In addition it comprises executing the trading request.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

The numerous objects and advantages of the present invention may be better understood by those skilled in the art by reference to the accompanying figures in which.

DETAILED DESCRIPTION OF THE INVENTION

The present invention relates generally to the interactions between a mobile handset and a server within a carrier network, and, more specifically, to the ability to create questionnaires for a mobile handset, store them in a network, and disseminate them to collect results.

Figure 1:
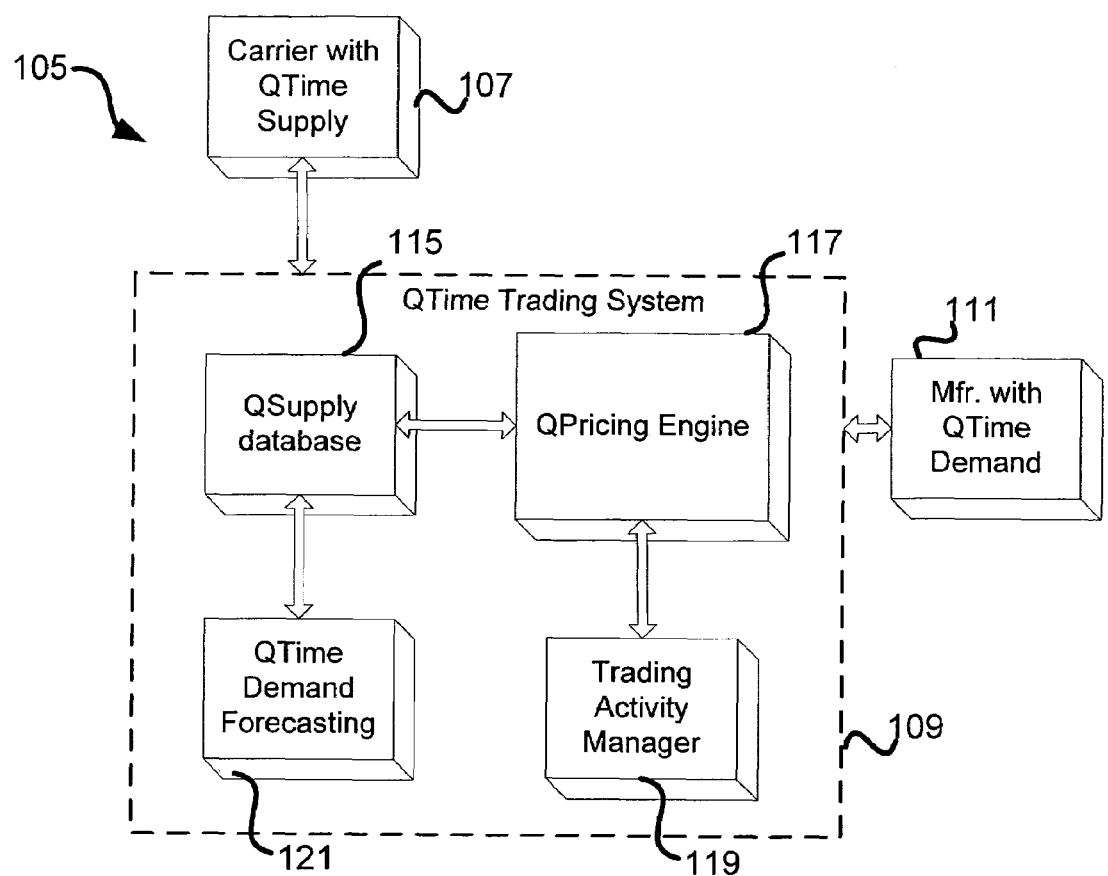
FIG. 1 is a perspective diagram of a QTime trading system that comprises a QSupply database that gathers information from one a more carrier networks that have a supply of QTime, a QTime Demand Forecasting component that provides information on the estimated demand for QTime (in the market) based on historical data and based on existing trading information maintained by the Trading activity manager, and a QPricing engine that determines pricing for trades of QTime based on current supply, current demand and forecasted demand.

FIG. 1 is a perspective diagram of a QTime trading system 109 that comprises a QSupply database 115 that gathers information from one a more carrier networks 107 that have a supply of QTime, a QTime Demand Forecasting component 121 that provides information on the estimated demand for QTime (in the market) based on historical data and based on existing trading information maintained by the Trading activity manager 119, and a QPricing engine that determines pricing for trades of QTime based on current supply, current demand and forecasted demand. A manufacturer of products 111 or a marketing company (or other consumers of QTime) can trade QTime or purchase QTime. The present invention introduces a new entity called QTime that is traded by the QTime trading system 109. QTime represents a unit of Questionnaire/survey volume that can be traded, for which one or more suppliers provide a supply of QTime so that the demand for QTime could be met. There are several categories of QTime that can be traded. QTime represents a unit of questionnaire opportunity that a mobile device subscriber has made a commitment to honor, i.e. QTime may be construed to be a unit of commitment by some subscriber to participate in a questionnaire/survey.

To make the consumption of QTime possible, a questionnaire network for mobile handsets 105 is necessary, that facilitates creation and dissemination of questionnaires accompanied by user interaction and results gathering activities. The user interaction is facilitated by a client component in the mobile handsets, such a client component either made available by the manufacturer of the mobile handsets or subsequently downloaded or otherwise installed by the user.

The designed questionnaire or survey questions are deposited into the repository—the creation and transfer facilitated by the creation tool.

Different categories of users are identified and managed in terms of how they can participate in questionnaires and surveys and how they can benefit from participating in such questionnaires/surveys.

The questionnaire/survey dissemination service is in the middle of the process of conducting surveys and questionnaires—it connects the creators with the dissemination network. For example, it makes it easy for product manufacturers to create the surveys and have them disseminated.

A carrier may sign up with end-users who agree to answer at least 10 questionnaires a month for a 50% discount on monthly phone bills. That way, the end user has incentives to participate in surveys and questionnaires, and the carrier has a contract with the end-user that the carrier can trade r sell n a secondary market.

The carrier can sell this contract to marketing companies or manufacturers of products, thus a secondary market in the contracts is created and supported by the present invention. Thus, the commitment by end users to answer surveys and questionnaires can be sold as contracts to marketing companies and manufacturers. This provides an effective way to take advantage of "real estate" of the end-user, i.e. the mobile device and user time that can been contracted out by the end-user.

In general, customer attributes that are known to the carrier or to the questionnaire service provider are employed in determining the participants in surveys and questionnaires. In addition, the track record of the end-users in completing the previous surveys and questionnaires are used to determine if they make good targets for next set of surveys and questionnaires. Thus, answers provided by the end-users is used to determine if they make good candidates for subsequent surveys or questionnaires.

In one embodiment, a marketing company provides profiles of targeted marketing and the questionnaire service provider facilitates the creation of a list of potential target users from the recipients of previous questioners/surveys or from the set of users that completed previous questioners/surveys, and forwards list of potential target users to the carrier network for dissemination of the relevant questionnaire/survey.

Thus, the present invention facilitates creation and marketing of a market for questionnaire contracts. In particular, it provides a system, such as a website, wherein carriers can advertise the available questionnaire/survey "volume" and rates and manufacturers of products or marketing companies can purchase them in 'bulk'. Thus, a trading website is created for trading on questionnaire and surveys, similar to commodity trading that is conducted online. Thus, producers of QTime and consumers of QTime can trade in QTime. In general, a trading system for trading on end-user commitments on participation in surveys, questionnaires, polls, consumer feedback, promotional activities, etc. makes it possible for bulk sales, bulk purchases and pricing based on supply and demand, thus creating a commodities trading system for such end-user commitments (such as QTime).

Typically, a questionnaire network comprises a plurality of mobile handsets communicatively coupled to a QPlatform QManagement Server that is typically located within a carrier network, a QStore accessible by the QManagement Server and also by a QPlatform Data Population component, a management interface and a results and activity logging database.

Figure 2:
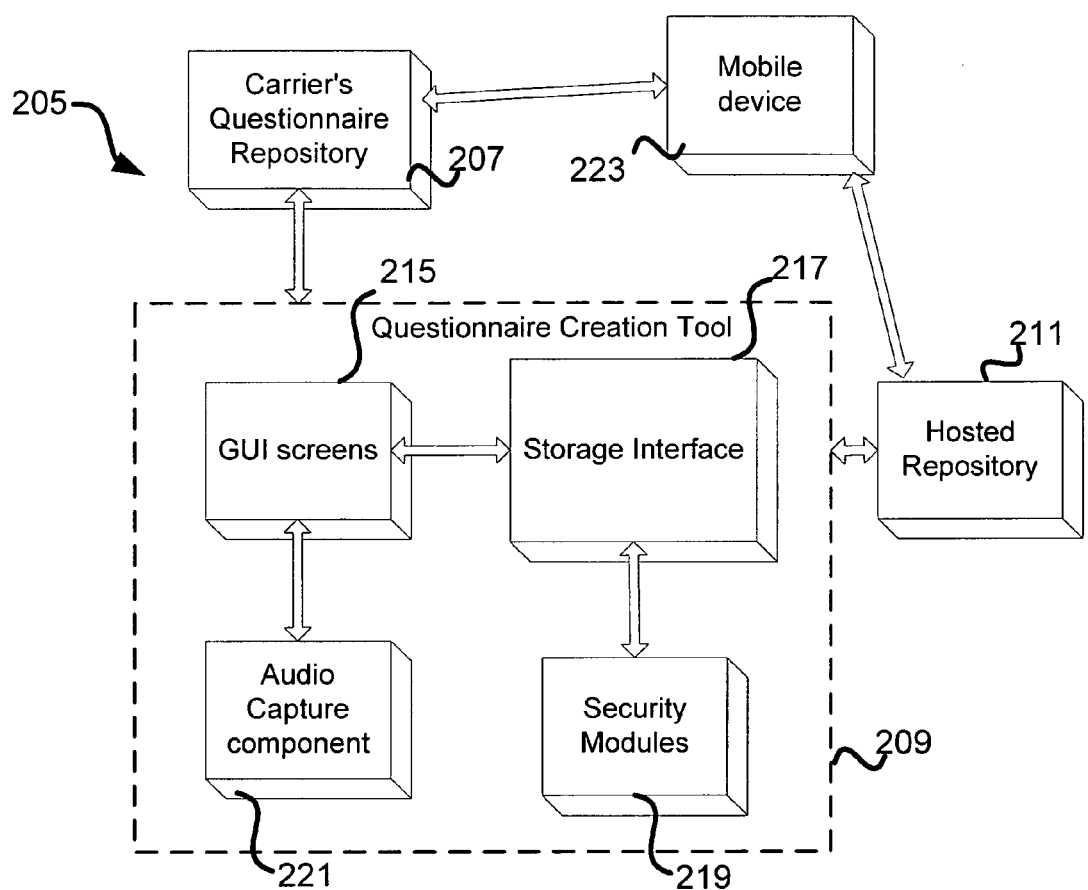
FIG. 2 is a perspective block diagram of a questionnaire creation tool network that comprises a questionnaire creation tool (QCT) that facilitates the creation of multi-media questionnaires for mobile wireless devices, such as mobile phones, a hosted repository that is used to host entire questionnaires or subsets of questionnaires, a carrier's questionnaire repository that is also capable of storing and disseminating entire questionnaires or subsets thereof, and a mobile device.

FIG. 2 is a perspective block diagram of a questionnaire creation tool network 205 that comprises a questionnaire creation tool (QCT) that facilitates the creation of multimedia questionnaires for mobile wireless devices, such as mobile phones, a hosted repository 211 that is used to host entire questionnaires or subsets of questionnaires, a carrier's questionnaire repository 207 that is also capable of storing and disseminating entire questionnaires or subsets thereof, and a mobile device 223. The QCT comprises GUI screens 215 used to enter textual content for questionnaires and assemble the questionnaire, an audio capture component 221 that facilitates creation of new preambles, audio supplementary information, etc. or the incorporation of pre-recorded audio information for preambles, etc., a storage interface 217 that facilitates storage of entries questionnaires or subsets of questionnaires at the carrier's questionnaire repository 207 or at the hosted repository 211, and a security modules component 209 that facilitates encryption, secure communications, etc.

In one embodiment of the present invention, the QCT is capable of creating questionnaires and storing them in such a way that audio inputs for preambles to questionnaires, individual questions or for supplementary information are stored in the hosted repository 211 while textual components of the questionnaires with appropriate URLs (or some other references) to the stored audio (or multi-media) inputs are stored at the carrier's questionnaire repository 207 and disseminated to the mobile device 223 by the carrier's questionnaire repository 207.

In one embodiment, the hosted repository 211 is external to a carrier's network and stores all audio information for the questionnaire created using the QCT 209 while the carrier's questionnaire repository 207 is used to store the rest of the questionnaire (that has references to the audio information stored in the hosted repository 211) that is retrieved by the mobile device 223. The mobile device 223 retrieves the questionnaire stored in the carrier's questionnaire repository 207 and, when appropriate (or when initiated by the user) retrieves the audio inputs and plays them for the end-user.

In one embodiment, based on user preference, the QCT incorporates all audio and textual content of a questionnaire into a self-contained XML document and stores it in the carrier's questionnaire repository 207 for eventual testing and/or dissemination to the mobile device 223. In a related embodiment, the QCT stores audio content of a questionnaire separately in a website and places references to them (such as URL) in an XML document for the questionnaire stored it in the carrier's questionnaire repository 207.

In general, the QCT also provides support for promoting a questionnaire in terms of providing screens for the specification of end-user profile expected to be used for the selection of end-users to answer the questionnaires (or surveys, etc.). The QCT also promotes interaction with the trading system in order to provide cost estimates to the user creating the questionnaire. In addition, it can help the creator of the questionnaire purchase a block of QTime from the trading system that will enable the carrier network to use the purchased block of QTime in its accounting/billing activities.

In general, a questionnaire creation tool network 205 makes it possible to create, disseminate, conduct questionnaires or surveys on mobile handsets and to collect results for processing and storage. The questionnaire creation tool network 205 is powered by a questionnaire creation, tool

209 and a questionnaire trading system. A questionnaire trading system for QTime makes it possible for producers of QTime, such as carriers, and consumers of QTime, such as product manufacturers and advertising companies, to buy or sell QTime in bulk and to trade in QTime as a commodity. In one embodiment, supplementary information and preambles that are part of a questionnaire are captured in audio form using the questionnaire creation tool 209 and are stored selectively along with the questionnaire in a carrier's questionnaire repository 207 or separately at a hosted repository 211.

Figure 3:
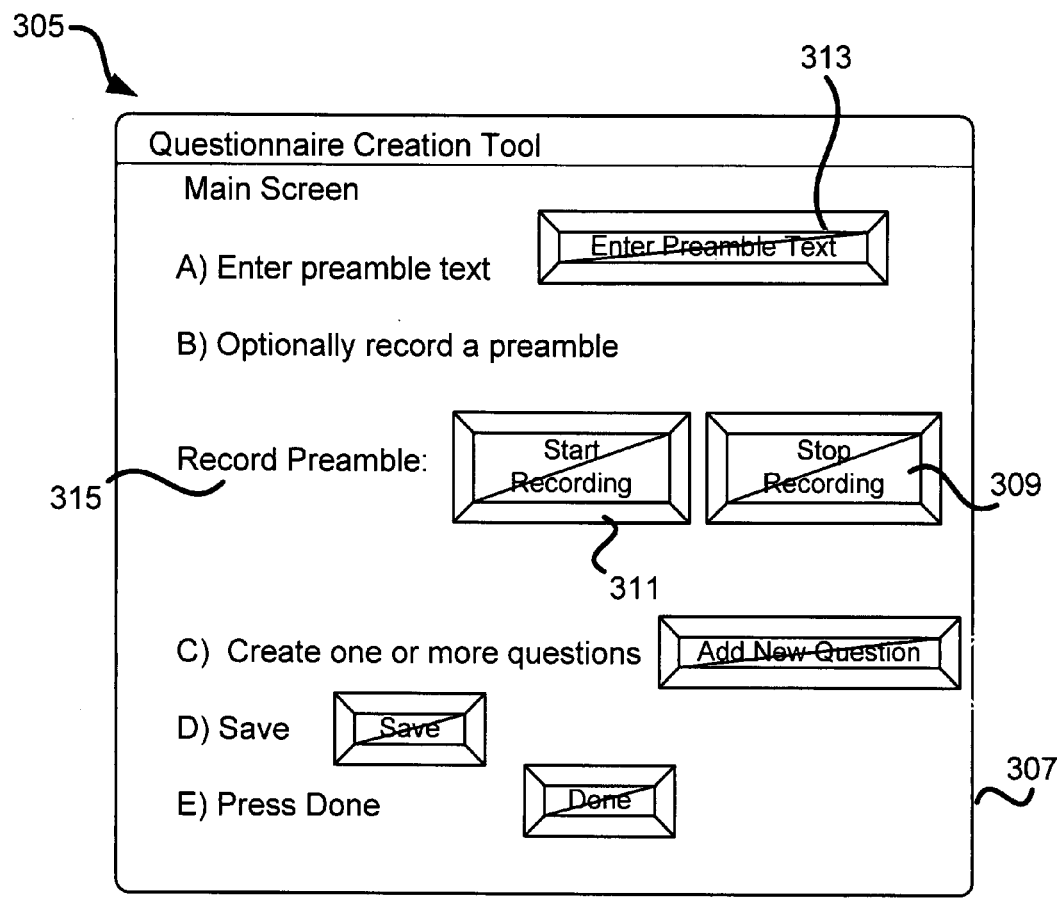
FIG. 3 is a main screen of a web-based questionnaire creation tool (QCT) that facilitates the population of questionnaires and surveys via web-based interactions.

FIG. 3 is a main screen of a web-based questionnaire creation tool (QCT) that facilitates the population of questionnaires and surveys via web-based interactions. The main screen provides buttons to invoke other screens (or web pages) that facilitate the entry of preamble text for the questionnaires, buttons for the optional recording of an audio preamble by means of the start recording and stop recording buttons, buttons for the display of screens or web pages that facilitate creation of one or more questions and their multiple choice answers, a button to save the questionnaire in an XML format either at a remote location or as a local file, and a done button to finish the questionnaire population process.

Figure 4:
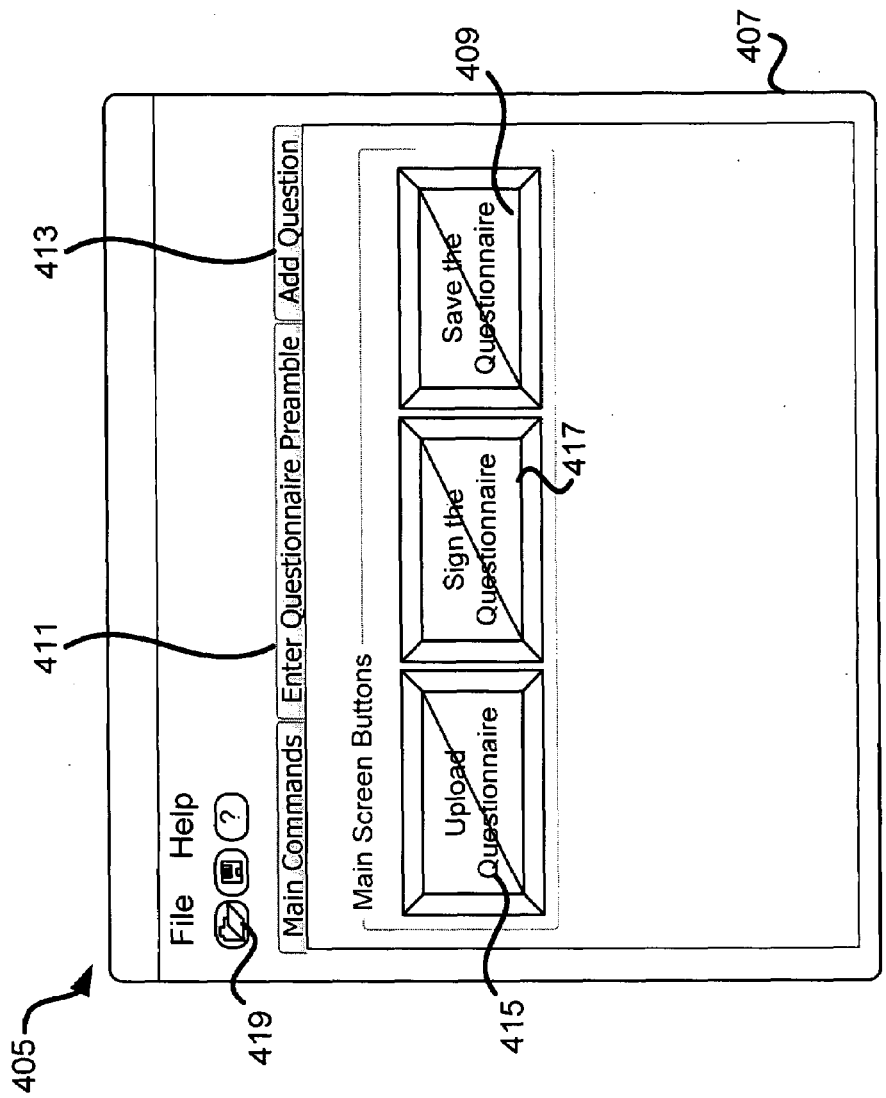
FIG. 4 is a main screen of a questionnaire creation tool (QCT) that can be run on a personal computer or a workstation and employed to create questionnaires that contain a combination of textual and audio components.

FIG. 4 is a main screen of a questionnaire creation tool (QCT) 405 that can be run on a personal computer or a workstation and employed to create questionnaires that contain a combination of textual and audio components. The QCT 405 has three main tabs, a main commands tab for the main screen 407, an enter questionnaire preamble tab 411 for entering questionnaire preamble using textual input and audio input, and a add question tab for populating individual questions using textual and or audio preamble, multiple choice textual entry, and supplementary information using textual or audio inputs.

The main screen 407 comprises a sign the questionnaire button 417 to digitally sign the created questionnaires, a save the questionnaire button 409 to save the questionnaire locally as an XML file and an upload questionnaire button 415 to save the questionnaire remotely at a website or database. The QCT 405 also comprises an open folder icon 419 for opening previously created questionnaires for modifications or additions, a save icon to save it as an XML file and a help icon to provide online help.

Although preambles and questions are described as comprising textual and or audio components, they can also comprise of video or picture inputs that are incorporated into the questionnaire. In addition, the multiple choices for questions may comprise of video or image prompts.

Figure 5:
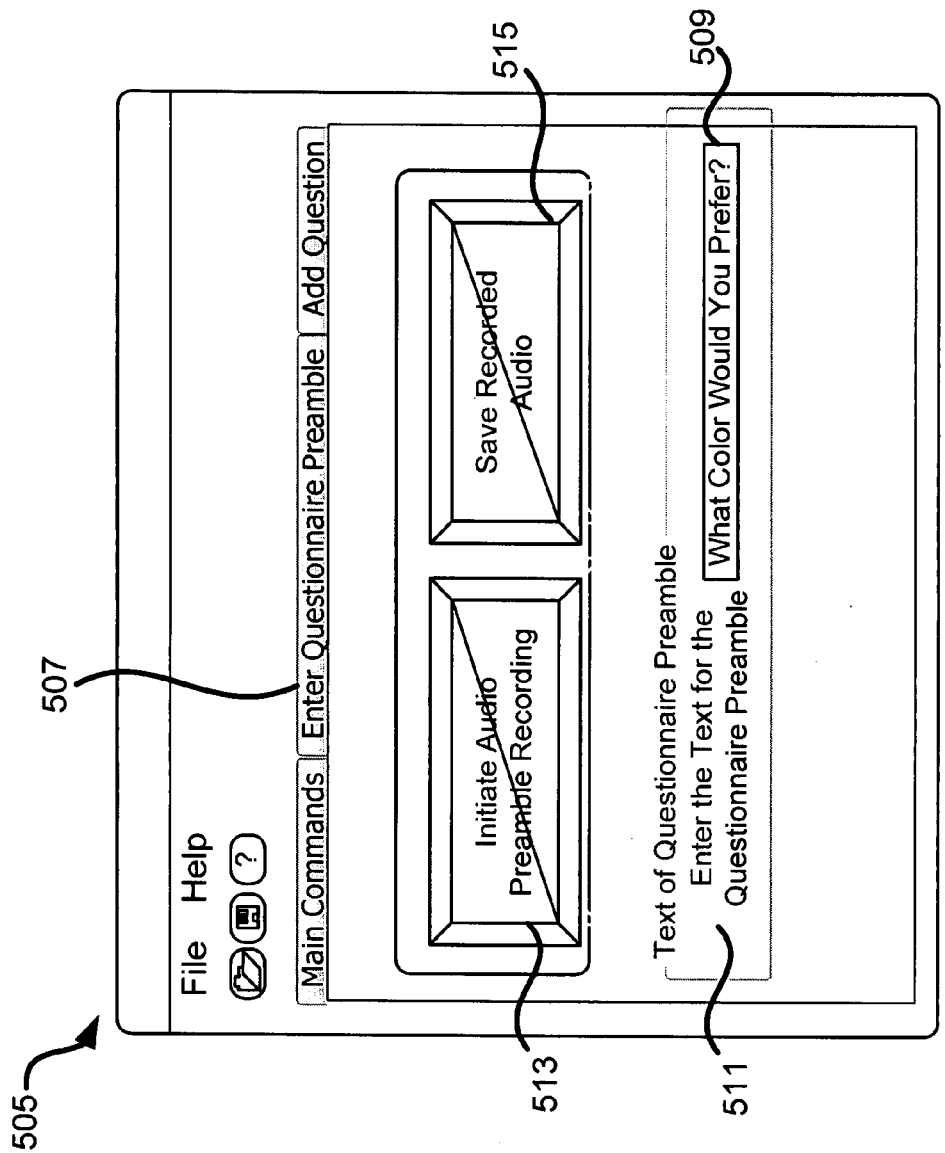
FIG. 5 is a questionnaire preamble screen of the questionnaire creation tool (QCT) that facilitates audio recording of questionnaire preamble and entry of textual components for a questionnaire preamble.

FIG. 5 is a questionnaire preamble screen 505 of the questionnaire creation tool (QCT) 405 that facilitates audio recording of questionnaire preamble and entry of textual components for a questionnaire preamble. Thus, both textual and audio components may be incorporated into a questionnaire preamble. The textual components will be displayed at the beginning of a questionnaire in a mobile handset. The audio preamble will be played simultaneously. In one embodiment, the audio preamble is played selectively based upon user request or based upon configuration in the mobile handset.

The questionnaire preamble screen 505 comprises a initiate audio preamble recording button 513 that, when invoked, opens up an audio recording window, a save recorded audio button 515 that helps save recorded audio as a file, wither locally or remotely, or as part of the questionnaire, and a text input window 509 that facilitates the entry of textual components of a questionnaire preamble.

Figure 6:
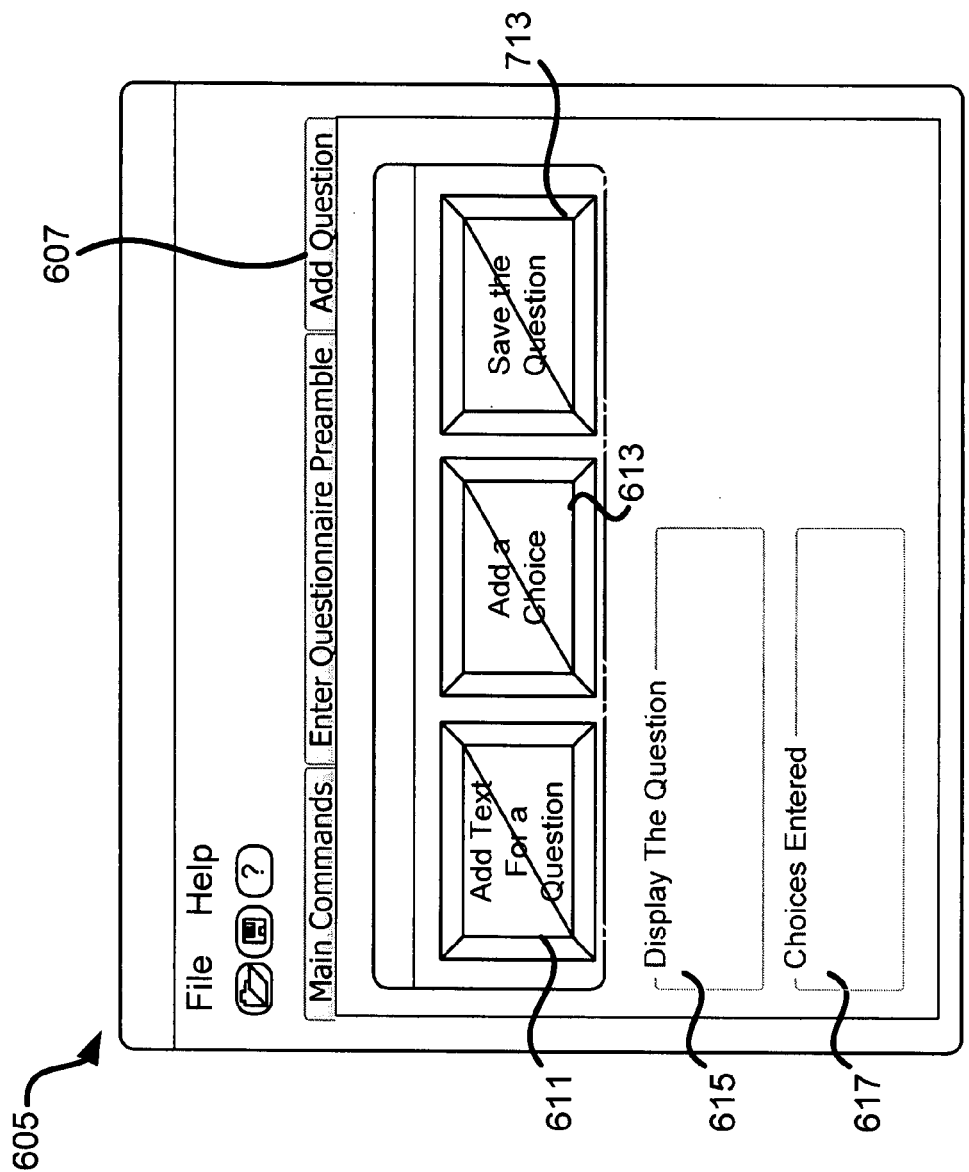
FIG. 6 is a add question screen 605 of the questionnaire creation tool (QCT) that facilitates entry of text for a question, entry of multiple choices of answers associated with a questions, display of the text entered for the question, display of multiple choice answers for the questions, and the storing of the question incorporation of the entered information as part of the questionnaire.

FIG. 6 is a add question screen 605 of the questionnaire creation tool (QCT) 405 that facilitates entry of text for a question, entry of multiple choices of answers associated with a questions, display of the text entered for the question, display of multiple choice answers for the questions, and the storing of the question incorporation of the entered information as part of the questionnaire.

The add question screen 605 comprises a add text for a question button 611, an add a choice button 613, a save the question button 609, a display the question panel 615 for the display of the entered text for a question, and a choices entered 617 list for the display of choices entered. The add question screen 605 also facilitates the audio recording of supplementary information for the question. Supplementary information is displayed or rendered, as appropriate, when a user answering the questionnaire on a mobile device requests supplementary information that can help him understand the question and determine an answer.

Figure 7:
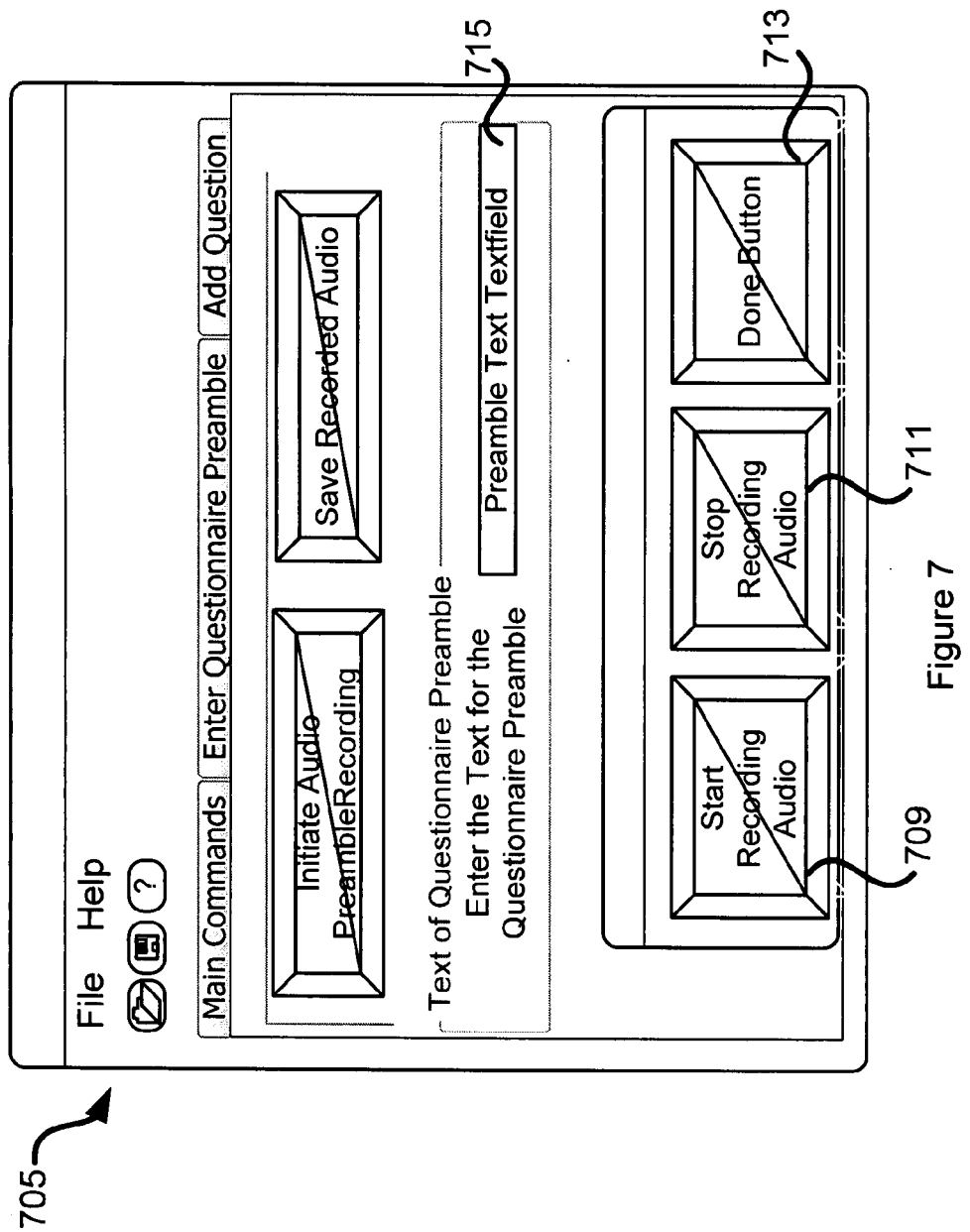
FIG. 7 is a questionnaire preamble screen of the questionnaire creation tool (QCT) with the recording actions window activated that facilitates recording of audio input for preamble and supplementary information for questions.

FIG. 7 is a questionnaire preamble screen 705 of the questionnaire creation tool (QCT) 405 with the recording actions window activated that facilitates recording of audio input for preamble and supplementary information for questions. When the initiate audio preamble recording button 513 is activated, the questionnaire preamble screen 705 opens up the recording actions window that comprises a start recording audio button 709, a stop recording audio button 711 and a done button 713. Based upon configuration of the QCT 405, the recorded audio is either incorporated as part of an XML document (including binary data for the recording in some standard audio format such as wav format or midi format), or saved separately as a file or as a web page with a reference incorporated into the XML document for the questionnaire.

In one embodiment, the questionnaire is a test for the end-user and the right answers are sent to the mobile device along with the test. The questionnaire client tool in the mobile device displays the questions, plays/renders the audio components and textual components as appropriate, gathers the answers and evaluates them locally in order to present results to the end-user taking the test without any intervention or support from the server-side other than the dissemination of the questionnaire. In a related embodiment, the results are not only computed and displayed in the local device but is also communicated to a questionnaire server in the server-side. In another related embodiment, the results are computed but not displayed in the local device, and it is also communicated to a questionnaire server in the server-side.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

Although a system and method according to the present invention has been described in connection with the preferred embodiment, it is not intended to be limited to the specific form set forth herein, but on the contrary, it is intended to cover such alternative, modifications and equivalents, as can be reasonably included within the spirit and scope of the invention as defined by this disclosure and appended diagrams.

What is claimed is:

1. A questionnaire time (QTime) trading system for facilitating trading in QTime, the QTime trading system comprising:
a QTime Supply database for storing and managing a dynamic supply of QTime Supply;
a QTime Pricing engine communicatively coupled to the QTime Supply database; and
a trading activity manager communicatively coupled to the QTime Pricing engine and the QTime Supply database.

2. The QTime trading system of claim 1 further comprising:
a QTime demand forecasting component communicatively coupled to the QTime Supply database;
the QTime Pricing engine employing a demand forecast provided by the QTime demand forecasting component to compute a QTime price for a unit of QTime;
the trading activity manager employing the QTime price in a trading activity.

3. The QTime trading system of claim 2 further comprising:
a QTime producer interface for receiving QTime supply information and for providing QTime demand information; and
a QTime consumer interface for providing at least one of a QTime supply irilbrmation to, a QTime pricing, and a QTime trading information.

4. The QTime trading system of claim 2 further comprising:
a QTime trading interface for facilitating QTime trading.

5. The trading interface of the QTime trading system of claim 4 further comprising:
an interface for buying and selling QTime.

6. The trading interface of the QTime trading system of claim 5 further comprising:
an interface for retrieving a QTime quote and a QTime trading information.

7. The QTime trading system of claim 6 wherein the QTime trading system facilitates the purchase of QTime in bulk via the trading interface.

8. The QTime trading system of claim 7 wherein the QTime trading system facilitates the selling of QTime in bulk via the trading interface.

9. The QTime trading system of claim 8 wherein QTime availability information is populated into a Qtime Supply database that is received from a QTime supplier system communicatively coupled to the QTime trading system.

10. The QTime trading system of claim 9 wherein the Qtime Pricing engine computes a price for a unit of QTime based on the amount of QTime currently available and the a forecast of the demand for QTime provided by the QTime demand forecasting component.

11. A questionnaire creation tool that facilitates creation and storage of questionnaires for mobile device, the questionnaire creation tool comprising:
an audio capture component that is used to create an audio preamble;
a GUI screens to provide a user screens to create a plurality of questions and associated answers for the questionnaire; and
a storage interface that is used to store the questionnaire in a carrier's questionnaire repository to be disseminated to a mobile device.

12. The questionnaire creation tool of claim 11 wherein the storage interface is used to store the questionnaire in an external hosted repository.

13. The questionnaire creation tool of claim 11 wherein the questionnaire is digitally signed before it is saved.

14. The questionnaire creation tool of claim 13 wherein the digitally signed questionnaire is uploaded to an external repository.

15. The questionnaire creation tool of claim 13 wherein the questionnaire comprises audio preamble as well as a textual preamble.

16. The questionnaire creation tool of claim 13 wherein the questionnaire creation tool facilitates the creation of the questionnaire that comprises an audio preamble, a textual preamble, and a plurality of questions, each of the plurality of questions comprising an audio question preamble and a textual question preamble.

17. The questionnaire creation tool of claim 13 wherein the questionnaire created comprises an audio supplementary information for at least one question in the questionnaire.

18. The questionnaire creation tool of claim 13 wherein the questionnaire created comprises a plurality of questions, each of the plurality of questions comprising multiple choices for an answer.

19. The questionnaire creation tool of claim 18 wherein the GUI screens comprise a preamble creation screen that comprises a start recording audio button and a stop recording audio button to capture real-time audio inputs.

20. The questionnaire creation tool of claim 11 that comprises a preamble creator for creating at least one of textual, audio or video preambles.

21. A questionnaire network comprising:
a wireless carrier network;
a mobile device that operates in the wireless carrier network;
a customer attributes associated with the mobile device, that is determined based on the mobile device specifications;
the wireless carrier network employing the customer attributes to determine a participant in a survey;
the wireless carrier network targeting the participant for the survey and communicating a questionnaire that is retrieved from a questionnaire repository.

22. A questionnaire network of claim 21 further comprising:
the carrier network tracking the record of the participant in completing the questionnaire;
the carrier network determining if the participant makes a good target for subsequent surveys and questionnaires.

23. The questionnaire network of claim 22 further comprising:
a questionnaire creation tool that makes it possible to create questionnaires and surveys;
the wireless carrier network disseminating and conducting questionnaires and surveys on the mobile device;
the wireless carrier network collecting, from the device, a results for processing and storage.

24. A method of trading in questionaire time (QTime) comprising:
contracting, by a telecom network with a plurality, of subscribers, to participate in a minimum number of questionnaires in exchange for a rebate or a payment, wherein the contracting commits each of the plurality of subscribers to a QTime contract that specifies a QTime quota;

aggregating the QTime contracts from the plurality of subscribers to create a QTime aggregated contract;

supplying the QTime aggregated contract to a QTime trading system for trading purposes; and receiving trading requests from at least one QTime consumer to buy or sell the QTime aggregated contract; and executing the trading request.

25. The method of trading in questionaire time (QTime) of claim 24 wherein executing comprises:

computing a quote price for QTime based on a current supply of QTime and on forecasts of demand for QTime;

buying of QTime based on selling requests and the quote price; and selling of QTime based on buying requests and the quote price.

* * * * *